US 6,633,463 B1

(12) United States Patent
Inoue et al.

(10) Patent No.: US 6,633,463 B1
(45) Date of Patent: Oct. 14, 2003

(54) THIN-FILM MAGNETIC HEAD, HEAD SUSPENSION ASSEMBLY, MAGNETIC DISK DEVICE AND MANUFACTURING METHOD OF THEM

(75) Inventors: Tohru Inoue, Tokyo (JP); Yoshihiko Yano, Tokyo (JP); Koichi Terunuma, Tokyo (JP)

(73) Assignee: TDK Corporation, Tokyo (JP)

( * ) Notice: Subject to any disclaimer, the term of this patent is extended or adjusted under 35 U.S.C. 154(b) by 416 days.

(21) Appl. No.: 09/699,521

(22) Filed: Oct. 31, 2000

(30) Foreign Application Priority Data

Nov. 1, 1999  (JP) ............................................. 11/311208

(51) Int. Cl.$^7$ ................................................. G11B 5/39
(52) U.S. Cl. ........................................................ 360/320
(58) Field of Search ............................... 360/320, 323, 360/324, 324.1, 324.11, 324.12, 324.2, 317, 126; 257/421, 425, 427, 536; 365/158, 171, 173; 338/32 R; 324/207.21, 252

(56) References Cited

U.S. PATENT DOCUMENTS

| | | | | |
|---|---|---|---|---|
| 4,251,795 A | * | 2/1981 | Shibasaki et al. | ......... 338/32 R |
| 6,359,289 B1 | * | 3/2002 | Parkin | ......... 257/43 |
| 6,381,171 B1 | * | 4/2002 | Inomata et al. | ......... 365/173 |

* cited by examiner

*Primary Examiner*—David L. Ometz
(74) *Attorney, Agent, or Firm*—Armstrong, Westerman & Hattori, LLP

(57) ABSTRACT

At least a part of the insulation layers is made of an insulation material which increases electric conductivity thereof when an ultraviolet radiation is irradiated. Thus, improved resistance properties against ESD can be obtained during fabrication.

8 Claims, 9 Drawing Sheets

THIN-FILM MAGNETIC HEAD, HEAD SUSPENSION ASSEMBLY, MAGNETIC DISK DEVICE AND MANUFACTURING METHOD OF THEM

FIELD OF THE INVENTION

The present invention relates to a thin-film magnetic head with a magnetoresistive effect element (MR element) such as a giant magnetoresistive effect element (GMR element) using for example a spin-valve (SV) magnetoresistive effect, and a tunnel magnetoresistive effect element (TMR element). Also, the present invention relates to a head suspension assembly (HSA) with the thin-film magnetic head, to a magnetic disk device with the HSA and to a manufacturing method of them.

DESCRIPTION OF THE RELATED ART

In a magnetic recording device such as a magnetic disk device, a thin-film magnetic head provided with an anisotropic magnetoresistive effect element (AMR element) made of magnetoresistance material having a resistance that changes depending upon the variation of applied external magnetic field is widely adopted. NiFe alloy (permalloy) has been used as the magnetic material of the AMR element.

Recently, the demand for miniaturization and larger data storage capacity of a magnetic recording medium has become remarkable. Hence, utilization of a GMR element which provides more powerful magnetoresistive effect is advancing quickly and development of a TMR element is also progressing abruptly.

The most popular GMR element is a SVMR element with a SV multi-layered film which has two ferromagnetic material layers separated by a nonmagnetic material layer. Magnetization direction of one of the ferromagnetic layers is constrained or maintained by an exchange coupling and that of the other is free to rotate in response to externally applied magnetic field. A large magnetoresistive effect can be obtained due to the change in the relative difference between the magnetization directions of these two ferromagnetic material layers. Since such GMR element can saturate its magnetization at a lower magnetic field than the AMR element, it is possible to read high density magnetic information.

In order to satisfy the demand for miniaturization and larger data storage capacity, the magnetic materials used for the thin-film magnetic head have been changed and also the structure of the thin-film magnetic head has been downsized. Most typical example of the downsizing is to reduce the thickness of each layer of the read element and the write element in the magnetic head.

The thin-film magnetic head with the GMR element or the TMR element is fabricated by the thin-film multi-layering process and thus each layer thereof tends to become extremely thicker. The GMR multi-layered film is in general sandwiched by two magnetic shield layers called as lower and upper shield layers. Insulation layers called as lower and upper shield gap layers for ensuring electrical insulation of the GMR film are formed between this element and the lower and upper shield layers, respectively.

As aforementioned, these lower and upper shield gap layers are extremely thinned in order to meet the needs of the recent downsizing over the GMR element. For example, the thickness of the shield gap layer in the AMR element is 100 nm or more, whereas that of the GMR element is about 50–60 nm which is substantially half as that of the AMR element. It is considered that these shield gap layers will be more thinned in the future.

Such thinner lower and upper shield gap layers may invite a damage of the thin-film magnetic head due to electro-static discharge (ESD). Electric charges staying on the surfaces of a human body and an object are called as static electricity, and a damage produced in an electronic element by the movement of the electric charge when the human body and the object contact and break with each other is called as an ESD damage. The ESD damage occurring when the element contacts with a charged member can be prevented to some extent by properly selecting the material of the member and by performing the antistatic processing of the element. However, if the worker himself is charged, it is difficult to prevent the ESD damage of the electronic element.

If a man performs a certain action, static electricity will arise on the human body. Although the electro-static voltage of the human body goes up and down according to humidity environment, easy operation such as for example walking on a carpet makes on the human body high electro-static voltage of about 35000 V under the atmosphere of a relative humidity of 10 per cent. If the floor is made of vinyl, the electro-static voltage of about 12000 V arises under the same atmosphere.

Resistance properties against ESD of various electronic devices used widely now are clarified through many researches. If 300–2500 V is applied to a simple transistor, 50–1000 V to a CMOS with a protection circuit, 10–100 V to a MOS-FET and only 5–10 V to the conventional general MR head, breakdown will occur. In case of the GMR element downsized, breakdown will occur at a lower electro-static voltage than that of the AMR head.

It should be noted that, in the GMR element or the TMR element, not only the breakdown may occur due to ESD but also the pinned or fixed direction of magnetization in the ferromagnetic material layer may change due to a little ESD.

SUMMARY OF THE INVENTION

It is therefore an object of the present invention to provide a thin-film magnetic head, a HSA with the thin-film magnetic head, a magnetic disk device with the HSA and a manufacturing method of them, whereby improved resistance properties against ESD can be obtained during fabrication.

A thin-film magnetic head, a HSA with the thin-film magnetic head and a magnetic disk device with at least one HSA has insulation layers. Particularly, according to the present invention, at least a part of the insulation layers is made of an insulation material which increases electric conductivity thereof when an ultraviolet radiation is irradiated.

All or a part of the insulation layers in the thin-film magnetic head are made of an insulation material that increases its electric conductivity when an ultraviolet radiation is irradiated, namely that has a photoconduction effect (internal photoelectric effect) to the ultraviolet radiation. Thus, if the thin-film magnetic head with the MR element, the HSA or the magnetic disk device is handled under the ultraviolet radiation irradiated environment, it is possible to reduce the resistance of the insulation layer only during the handling. Thus, various problems due to ESD, such as the ESD damage or the undesirable rotation of the pinned direction in the MR element can be prevented from occurring.

It is preferred that the thin-film magnetic head includes an element formed surface on which at least one head element is formed, and that the at least a part of the insulation layers includes an overcoat layer for covering the element formed surface.

It is also preferred that the thin-film magnetic head includes a MR element having shield gap layers, a MR film sandwiched by the shield gap layers and lead conductors connected to the MR film and sandwiched by the shield gap layers, and that the at least a part of the insulation layers includes the shield gap layers.

Preferably, the MR element is a GMR element or a TMR element.

It is preferred that the at least a part of the insulation layers includes a GaN film. More preferably, the at least a part of the insulation layers includes an under layer of an AlN film, and a GaN film deposited on the AlN film.

According to the present invention, also, a method of manufacturing a thin-film magnetic head includes a step of forming at least a part of insulation layers of the thin-film magnetic head with an insulation material which increases electric conductivity thereof when an ultraviolet radiation is irradiated, and a step of performing at least a part of subsequent processes by irradiating an ultraviolet radiation to the thin-film magnetic head.

Furthermore, according to the present invention, a method of manufacturing a HSA with a thin-film magnetic head includes a step of forming at least a part of insulation layers of the thin-film magnetic head with an insulation material which increases electric conductivity thereof when an ultraviolet radiation is irradiated, and a step of performing at least a part of subsequent processes by irradiating an ultraviolet radiation to the thin-film magnetic head.

According to the present invention, in addition, a method of manufacturing a magnetic disk device with a thin-film magnetic head includes a step of forming at least a part of insulation layers of the thin-film magnetic head with an insulation material which increases electric conductivity thereof when an ultraviolet radiation is irradiated, and a step of performing at least a part of subsequent processes by irradiating an ultraviolet radiation to the thin-film magnetic head.

If the thin-film magnetic head with the MR element, the HSA or the magnetic disk device is handled under the ultraviolet radiation irradiated environment as aforementioned, it is possible to reduce the resistance of the insulation layer during the handling. Thus, various problems due to ESD, such as the ESD damage or the undesirable rotation of the pinned direction in the MR element can be prevented from occurring.

It is preferred that the thin-film magnetic head includes an element formed surface on which at least one head element is formed, and that the forming step includes forming an overcoat layer for covering the element formed surface with an insulation material which increases electric conductivity thereof when the ultraviolet radiation is irradiated.

It is also preferred that the thin-film magnetic head includes a MR element having shield gap layers, a MR film sandwiched by the shield gap layers and lead conductors connected to the MR film and sandwiched by the shield gap layers, and that the forming step includes forming the shield gap layers with an insulation material which increases electric conductivity thereof when the ultraviolet radiation is irradiated.

Preferably, the MR element is a GMR element or a TMR element.

It is preferred that the at least a part of the insulation layers includes a GaN film. More preferably, the at least a part of the insulation layers includes an under layer of an AlN film, and a GaN film deposited on the AlN film.

Preferably, the AlN film is deposited by an electron cyclotron resonance sputtering (ECR), and the GaN film is deposited to have a strong orientation by a reactive sputtering using a high purity liquid target.

Thanks to thus deposited AlN/GaN film as the insulation layer of the thin-film magnetic head, lowering of the yield of the head due to ESD can be very effectively prevented.

Further objects and advantages of the present invention will be apparent from the following description of the preferred embodiments of the invention as illustrated in the accompanying drawings.

DESCRIPTION OF THE PREFERRED EMBODIMENTS

Figure 1:
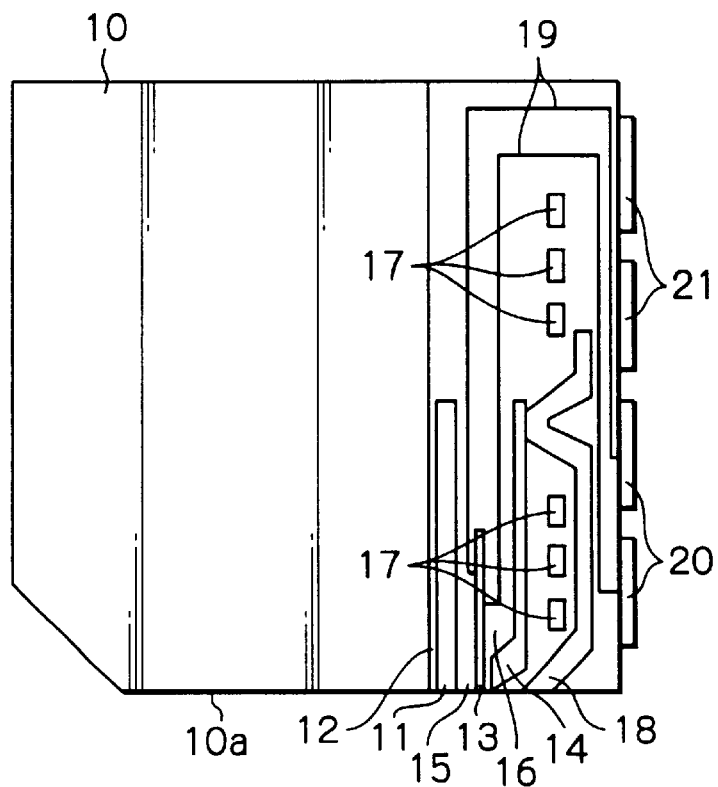
FIG. 1 shows a sectional view schematically illustrating a structure of a thin-film magnetic head as a preferred embodiment according to the present invention.
Figure 2:
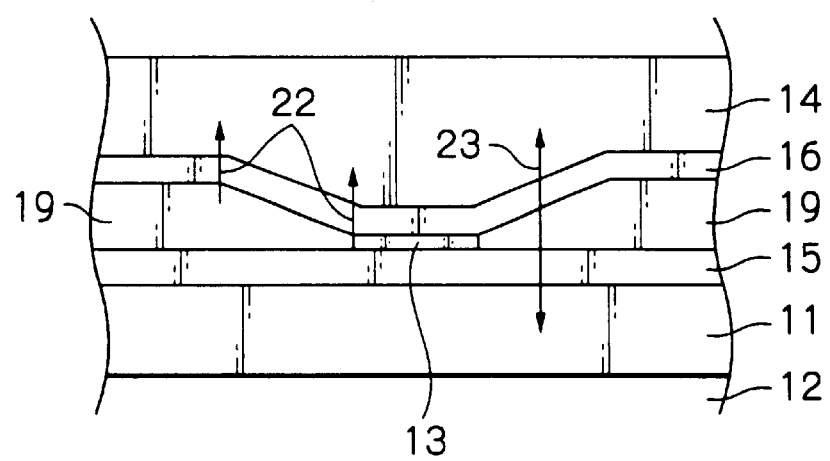
FIG. 2 shows a plane view illustrating a part of the thin-film magnetic head shown in FIG. 1, seen from the air bearing surface (ABS)

FIG. 1 schematically illustrates a structure of a thin-film magnetic head as a preferred embodiment according to the present invention, and FIG. 2 illustrates a part of the thin-film magnetic head shown in FIG. 1, seen from the ABS.

In the figures, reference numeral 10 denotes a substrate or slider, 10a the ABS of the slider 10, 11 a lower shield layer formed on an insulation layer 12 which is deposited on the substrate 10, 13 a SVMR multi-layered film, 14 an upper shield layer or a lower pole layer of an inductive head part element, 15 and 16 lower and upper shield gap layers formed between the lower and upper shield layers 11 and 14 to sandwich the SVMR multi-layered film 13 and its lead conductors (19) there between, 17 a coil of the inductive element, 18 an upper pole layer of the inductive element, 19 a pair of the lead conductors with one ends connected to both end portions of the SVMR multi-layered film 13, 20 a pair of terminal electrodes for a SVMR element, connected to the other ends of the lead conductors 19 and substantially exposed to a surface of the slider, on which the SVMR and inductive elements are formed, and 21 a pair of terminal electrodes for the inductive element, connected to both ends of the coil 17 via a pair of lead conductors (not shown), respectively.

Figure 3:
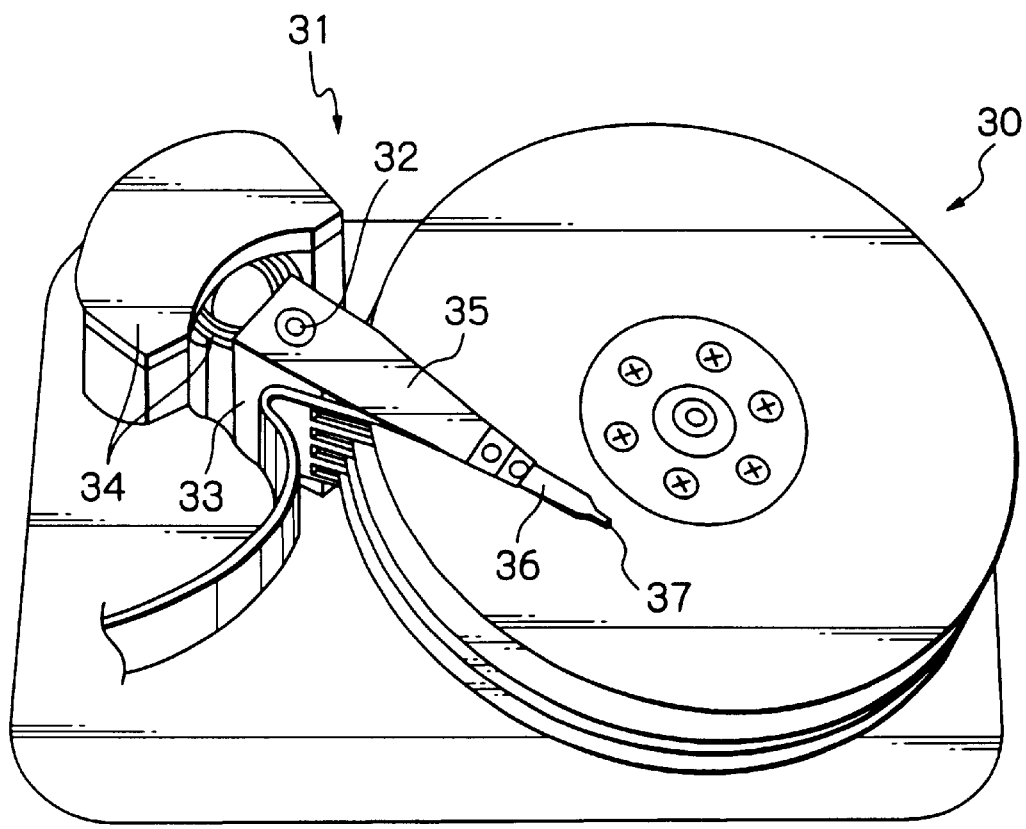
FIG. 3 shows an oblique view schematically illustrating a main-part structure of a magnetic disk device with the thin-film magnetic head shown in FIG. 1.

FIG. 3 schematically illustrates a main-part structure of a magnetic disk device with the thin-film magnetic head shown in FIG. 1.

In the figure, reference numeral 30 denotes a plurality of magnetic disks rotating around an axis in operation, and 31 denotes an assembly carriage device for positioning the magnetic head on a track of the magnetic disk. The assembly carriage device 31 is mainly constituted by a carriage 33 rotatable around an axis 32 and an actuator 34 such as for example a voice coil motor (VCM) for driving the carriage 33 to rotate. Base end portions of a plurality of drive arms 35 stacked along the axis 32 are attached to the carriage 33. A head suspension assembly (HSA) 36 is fixed to a top end portion of each drive arm 35. Each HSA 36 having a thin-film magnetic head 37 at its top end portion is attached to the drive arm 35 so that the ABS of the magnetic head 37 opposes to the surface of each magnetic disks 30. Only one HSA is attached to each of the top and bottom drive arms 35, whereas two HSAs are attached to each of the drive arms 35 located in operation between the adjacent magnetic disks 30.

In this embodiment, particularly, the lower and upper shield gap layers 15 and 16 formed to sandwich the SVMR multi-layered film 13 and its lead conductors 19 between them are made of an insulation material which increases its electric conductivity when an ultraviolet radiation is irradiated, in other words, has the photoconduction effect (internal photoelectric effect) to the ultraviolet radiation.

Namely, inventors of the instant application have investigated and invented that, in order to improve the resistance properties of a MR element against ESD, especially the ESD resistance when a worker handles the thin-film magnetic head with the MR element, it is very effective (1) to make the insulation layers around the lead conductors of the MR element by a material which has an energy band gap within the ultraviolet radiation region, and (2) to irradiate the ultraviolet radiation to the magnetic head only when it is handled to reduce the resistance of the insulation layer. Thus, an effective bypass circuit will be formed only when the magnetic head is irradiated by the ultraviolet radiation resulting the electro-static charges to dissipate before the ESD damage of the MR element occurs.

If the lower and upper shield gap layers are made of the conventional insulation material, static charges will be accumulated at interface portions of the insulation layer which faces the lower shield layer, the upper shield layer, the lead conductors and/or the SVMR multi-layered film. If the accumulated charges exceed a critical, the charges will dissipate through edge portions of the conductive members as shown by a reference numeral 22 in FIG. 2 causing an electrical breakdown to produce. Whereas, according to this embodiment, since an insulation material having an energy band gap within the ultraviolet region is used for the lower and upper shield gap layers and the ultraviolet radiation is irradiated thereto, the whole area from the lower shield layer to the upper shield layer becomes conductive and electrons can be freely moved through this area as shown by a reference numeral 23 in FIG. 2. Thus, no static charge will be accumulated in the lower and upper shield gap layers.

As for the insulation material, it is effective to use a GaN (gallium nitride) thin-film deposited by sputtering using a liquid material target. Furthermore, it is more effective to add a AlN (aluminum nitride) film as an under layer deposited by the ECR sputtering and oriented.

Such insulation material having an energy band gap within the ultraviolet wavelength region may be selected with reference to the following relationship:

$$E(eV)=1.24/\lambda(\mu m)=hc/\lambda(\mu m) \quad (1)$$

where E (eV) is an electronic energy, $\lambda$ ($\mu$m) is a wavelength of light, h is the Planck's constant (=6.63×10$^{-34}$ (Js)), and c is the speed of light (=3×10$^8$ (m/s)).

Selection of light sources of the ultraviolet radiation will be restricted because it has to be mounted in a process environment for fabricating the thin-film magnetic heads. In this embodiment, commercially available handy UV lamps of short wavelength (254 nm) type are used to irradiate the ultraviolet radiation to the thin-film magnetic head, the HSA or the magnetic disk device during necessary processes.

As aforementioned, the present invention utilizes the photoconduction effect (internal photoelectric effect). There are two type of the photoconduction effect, an intrinsic type and an extrinsic type. The intrinsic photoconduction effect utilizes electrons so that electrons at the top of the valence band jump over the energy band gap Eg and excite in the conduction band to improve conductivity, whereas the extrinsic photoconduction effect utilizes donors or acceptors instead of the electrons. Although the extrinsic photoconduction effect can be utilized in a long wavelength region such as an infrared region and with a low energy radiation because it responds to a low excitation energy, this effect is not desired because the deposition process of the layer will become complicated due to necessary diffusion of impurities. Therefore, the instant invention requires to use a material that can present the intrinsic photoconduction effect in response to a light energy in the ultraviolet radiation region and can be easily deposited by a simple process.

It can be induced from the aforementioned relationship (1) that the wavelength of 254 nm of the ultraviolet radiation from the handy UV lamp corresponds to energy of about 4.90 eV. Thus, the insulation layer material should be selected from extrinsic semiconductor materials with a band gap narrower than this energy band. Of course, any material which becomes conductive under the visible light environment should not be used as the insulation layer material. In other words, no material with an energy level within that of the visible light (wavelength of 380–770 nm, in general) can be used as the insulation layer material. Therefore, a desired material for the insulation layer should have an energy band gap from about 3.36 eV to about 4.90 eV. In considering the excitation efficiency of light, the desired material should have an energy band gap from about 3.36 eV to about 4.00 eV.

There are several materials which satisfy the above-mentioned conditions, such as ZnS (zinc sulfide, 3.6 eV), ZnO (zinc oxide, 3.2 eV) and GaN (3.4 eV). However, when selecting a material for the insulation layer of the magnetic head, it will be necessary to check at least the fitness of the material to contact with magnetic material layers and the simplicity of its deposition process. Since S (sulfur) is extremely easily diffused into the Fe (iron) family material, it is not desired to use ZnS as the insulation layer material. Also, ZnO is not best for the insulation layer material because its band gap is located at the middle of the visible light region and the ultraviolet radiation region and thus its insulation properties may change depending upon the change in environments. It may be considered that some kinds of $TiO_2$ (titanium dioxide) are used for the insulation layer material. However, as it is known, since $TiO_2$ has been used as an optical catalyst under a visible light condition, its insulation properties may change as well as ZnO.

As a result, the most desired material for the insulation layer is GaN. However, there is a problem in temperature at the deposition of a GaN layer.

In order to effectively exploit the photoconduction properties of a GaN thin-film, it is important to make the GaN film in a quality near a monocrystal film. An organo-metallic vapor phase epitaxial growth method (OMVPE method) using ammonia which is rich in reactivity as nitrogen materials or a molecular beam epitaxial growth method (MBE method) using active nitrogen may be in general performed for achieving this purpose when a thin-film of a light-emitting element is deposited. In depositing the GaN thin-film using the OMVPE method or the MBE method, it is required that a monocrystal substrate such as a sapphire substrate is used and that the substrate is heated to 500–1000° C. However, environment temperature during the fabrication processes of the thin-film magnetic head has to be kept to 250° C. at the maximum, and furthermore the magnetic layer material cannot be mono-crystallized. Therefore, neither the OMVPE method nor the MBE method can be used for the fabrication of the thin-film magnetic head.

As for low temperature deposition methods of the insulation layer, there are an active sputtering method and a plasma chemical vapor deposition (CVD) method. According to these methods, although the deposition can be performed while keeping the temperature of a sample substrate within a range between the room temperature and 250° C., it is difficult to form a thin-film with an orientation similar to that of the monocrystal. Furthermore, in case of the low temperature deposition process, a purity of materials poses a problem. Namely, a monocrystal film containing a little impurities can be deposited due to the large reaction energy in case of the high-temperature process. But in case of the low-temperature process, since deposition is performed where impurities are intermingled, the purity and the crystallinity of the deposited film become bad.

The TMG used in the CVD method is an organic metal and contains impurities. Therefore, it is necessary to deposit the insulation layer by a sputtering method using a high purity gallium (Ga) as a starting material.

The high purity Ga metal exists in liquid state. Therefore, in this embodiment, a sputtering is executed using nitrogen ($N_2$) gas and a high purity Ga material in liquid state held in a crucible type target holder to obtain a high purity GaN film.

A strongly oriented AlN film may be used as an under layer of the GaN film to improve crystallinity of this GaN film. An under layer of the AlN film is formed by using the ECR sputtering method which can easily form the AlN film with (002) orientation at the room temperature, so that a GaN thin-film with good orientation can be provided in low temperature environments. This AlN/GaN thin-film is extremely effective for use as the insulation layer according to the present invention.

Detail in formations of the single layer film of GaN and the AlN/GaN film should be referred to first and second examples described later.

The wafer process (integration process) of the thin-film magnetic heads in this embodiment is substantially the same as that of the conventional art except that the lower shield gap layer 16 and the upper shield gap layer 16 sandwiching the SVMR multi-layered film 13 and its read conductors 19 there between are made of the insulation material with the photoconduction effect against the ultraviolet radiation, and that the ultraviolet radiation is irradiated to the wafer during processes during which an ESD damage may be induced by handling the wafer.

Processes after the wafer process, during which an ESD damage may be induced by handling, such as machining processes including a cutting process from the wafer to bars, a machining and polishing process of the ABS and a separating process into individual head sliders, as a HSA forming process by mounting the slider onto a suspension, and as an assembling process of the HSA to a magnetic disk device are also executed under the environment of the ultraviolet radiation irradiation.

As mentioned before, in this embodiment, commercially available handy UV lamps of short wavelength (254 nm) type are used to irradiate the ultraviolet radiation to the thin-film magnetic head, the HSA or the magnetic disk device during necessary processes. These handy UV lamps are adequately mounted to holders or stands depending upon the working conditions.

When using such UV lamps, influence on a human body must be carefully taken into consideration. A worker has to carry ultraviolet ray prevention glasses, mask or goggles for protection of eyes. Use of the protection implement for covering whole face from the viewpoint of protection of the face is desirable. Sufficient measures against prevention about the ultraviolet radiation contamination of the skin is also required.

In this embodiment, since the machining process is performed in a clean room, the worker is wearing a dust preventative clothing for covering the whole body resulting that sufficient measures against ultraviolet radiation contamination are completed. However, when it is going to carry out a machining process or an assembly process out of the clean room, measures to contamination will be needed.

The measures against an ultraviolet ray must be taken into consideration also about the influence not only on specialized workers but general workers. In the clean room, partitions are prepared to make a limited zone for ultraviolet radiation working. No entry of the general workers into this limited zone is allowed to take safe measures.

It is physically impossible to equip large-sized machine used in cutting, in bonding or in evaluating work into the limited zone for ultraviolet radiation working, and it is not desirable to specify the whole clean room to be the ultraviolet-radiation working zone on safe measures. If the works performed in this limited zone are restricted to a mounting work of a thin-film magnetic head onto a suspension, and to a attaching work of a thin-film magnetic head in a wafer state, in a bar state or in an individual piece state to various machining jigs or to an exclusive jig of an evaluation device, management of the ultraviolet radiation will become easy. In general, insulation material such as zirconia ceramics covers contact points of the jigs providing safe measures against the ESD damage, with the wafer, with the bar or with the slider piece. Thus, as long as the magnetic head is attached to such jig, no influence of ESD will be directly applied to the magnetic head. Therefore, the magnetic head attached to the jig can be safely machined, and transferred to and processed at the evaluation device under the normal light without irradiation of the ultraviolet radiation.

Figure 4:
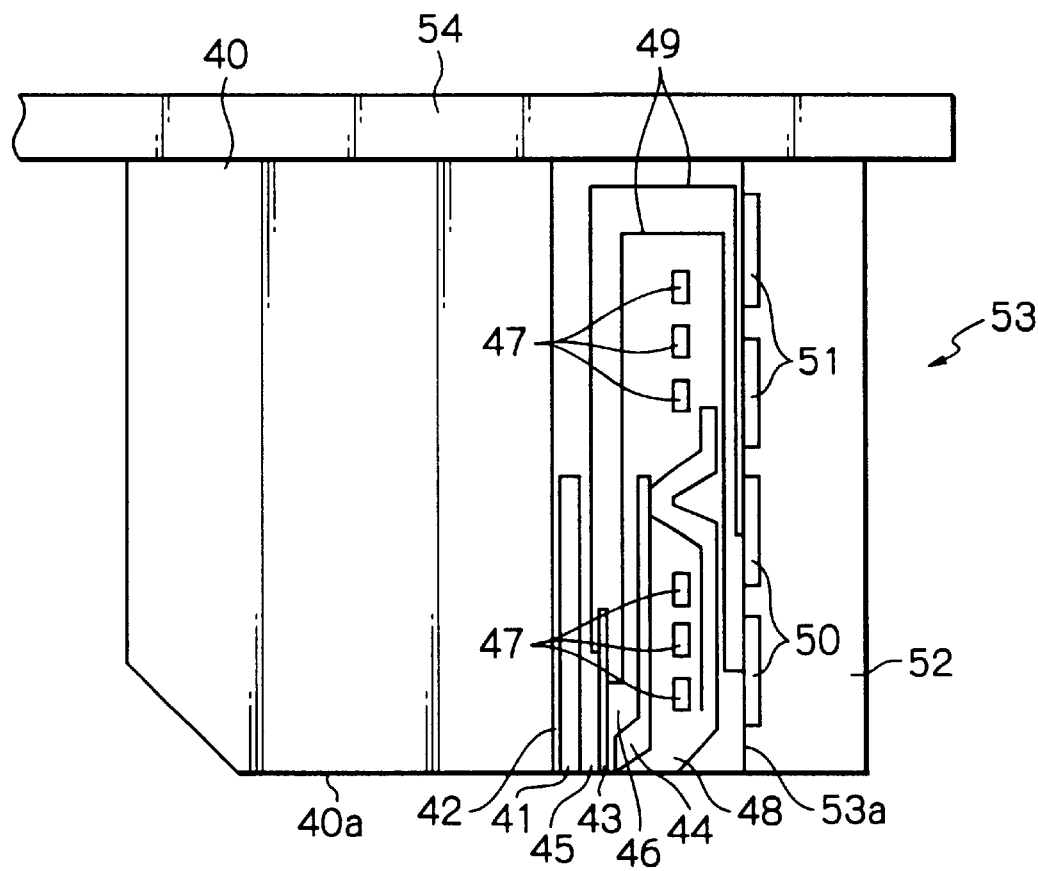
FIG. 4 shows a sectional view schematically illustrating a partial structure of a thin-film magnetic head and a suspension as another embodiment according to the present invention.
Figure 5:
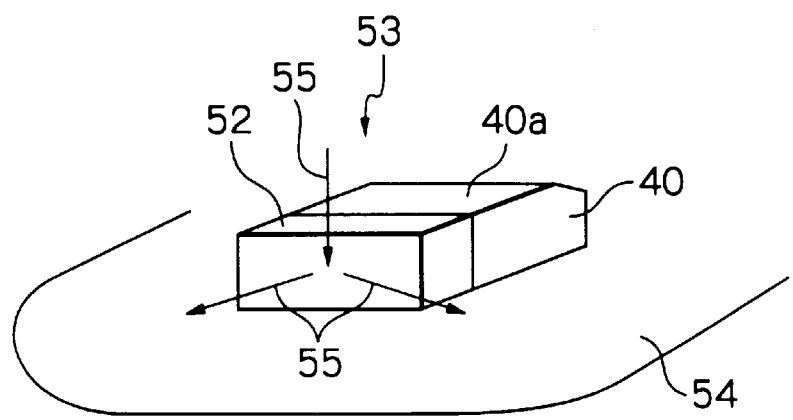
FIG. 5 shows an oblique view schematically illustrating a part of the thin-film magnetic head and the suspension shown in FIG. 4.

FIG. 4 schematically illustrates a structure of a thin-film magnetic head as another embodiment according to the present invention, and FIG. 5 illustrates a part of the thin-film magnetic head and a suspension shown in FIG. 4.

In the figures, reference numeral 40 denotes a substrate or slider, 40a the ABS of the slider 40, 41 a lower shield layer formed on an insulation layer 42 which is deposited on the substrate 40, 43 a spin-valve magnetoresistive effect (SVMR) multi-layered film, 44 an upper shield layer or a lower pole layer of an inductive head part element, 45 and 46 lower and upper shield gap layers formed between the lower and upper shield layers 41 and 44 to sandwich the SVMR multi-layered film 43 and its lead conductors (49) there between, 47 a coil of the inductive element, 48 an upper pole layer of the inductive element, 49 a pair of the lead conductors with one ends connected to both end portions of the SVMR multi-layered film 43, 50 a pair of terminal electrodes for a SVMR element, connected to the other ends of the lead conductors 49 and substantially exposed to a surface of the slider, on which the SVMR and inductive elements are formed, 51 a pair of terminal electrodes for the inductive element, connected to both ends of the coil 47 via a pair of lead conductors (not shown), 52 an overcoat layer formed on the element formed surface 53a of this thin-film magnetic head 53, and 54 a conductive suspension on which the magnetic head 53 is mounted, respectively.

The structure of a magnetic disk device with the thin-film magnetic head 53 is substantially the same as that shown in FIG. 3.

In this embodiment, particularly, the overcoat layer 52 formed on the element formed surface 53a of this thin-film magnetic head 53 is made of an insulation material which increases its electric conductivity when an ultraviolet radiation is irradiated, in other words, has the photoconduction effect (internal photoelectric effect) to the ultraviolet radiation.

Namely, inventors of the instant application have investigated and invented that, in order to improve the resistance properties of a MR element against ESD, especially the ESD resistance when a worker handles the thin-film magnetic head with the MR element, it is very effective (1) to make the overcoat layer 52 on the element formed surface 53a by a material which has an energy band gap within the ultraviolet radiation region, and (2) to irradiate the ultraviolet radiation to the magnetic head only when it is handled to reduce the resistance of the overcoat layer 52. Thus, an effective bypass circuit will be formed only when the magnetic head is irradiated by the ultraviolet radiation resulting the electrostatic charges to dissipate before the ESD damage of the MR element occurs.

Since an insulation material having an energy band gap within the ultraviolet region is used for the overcoat layer 52 and the ultraviolet radiation is irradiated thereto, electrons applied to the surface of the head will be passed through this overcoat layer to the suspension as shown by a reference numeral 55 in FIG. 5. Thus, no static charge will be accumulated in the overcoat layer resulting no ESD damage in the head to occur. Although the MR element and the inductive element are embedded in the overcoat layer, since the sectional area of the overcoat layer is extremely larger than that of the elements, no ESD damage will produced in the elements.

In this embodiment, also, the overcoat layer 52 is constituted by a single layer film of GaN or by an AlN/GaN film. Detail in formations of the single layer film of GaN and the AlN/GaN film should be referred to first and second examples described later.

The wafer process (integration process) of the thin-film magnetic heads in this embodiment is substantially the same as that of the conventional art except that the overcoat layer 52 made of the insulation material with the photoconduction effect against the ultraviolet radiation is formed on the element formed surface 53a, and that the ultraviolet radiation is irradiated to the wafer during processes during which an ESD damage may be induced by handling the wafer.

Processes after the wafer process, during which an ESD damage may be induced by handling, such as machining processes including a cutting process from the wafer to bars, a machining and polishing process of the ABS and a separating process into individual head sliders, as a HSA forming process by mounting the slider onto a suspension, and as an assembling process of the HSA to a magnetic disk device are also executed under the environment of the ultraviolet radiation irradiation.

It is possible to combine the above-mentioned two embodiments. That is, while the lower and upper shield gap layers are formed with the insulation material with the photoconduction effect against the ultraviolet radiation, and the overcoat layer formed by the insulation material with the photoconduction effect against the ultraviolet radiation may be formed on the element formation surface. If combined them, the tolerance against ESD during manufacturing can be increased.

It is also clear that the above-mentioned embodiments and other well-known ESD measures technology may be combined.

Although only the lower and upper shield gap layer and/or the overcoat layer are formed by an insulation material with the photoconduction effect against the ultraviolet radiation in the aforementioned embodiments, remaining all insulation layers of the thin-film magnetic head may be formed by that with the photoconduction effect against the ultraviolet radiation according to the present invention.

Furthermore, as for the MR element, not only the SVMR element but also another GMR element and a TMR element can be used.

FIRST EXAMPLE

In this first example, a GaN single layer film was deposited by a sputtering method using a liquid state target and its characteristics was evaluated.

Figure 6:
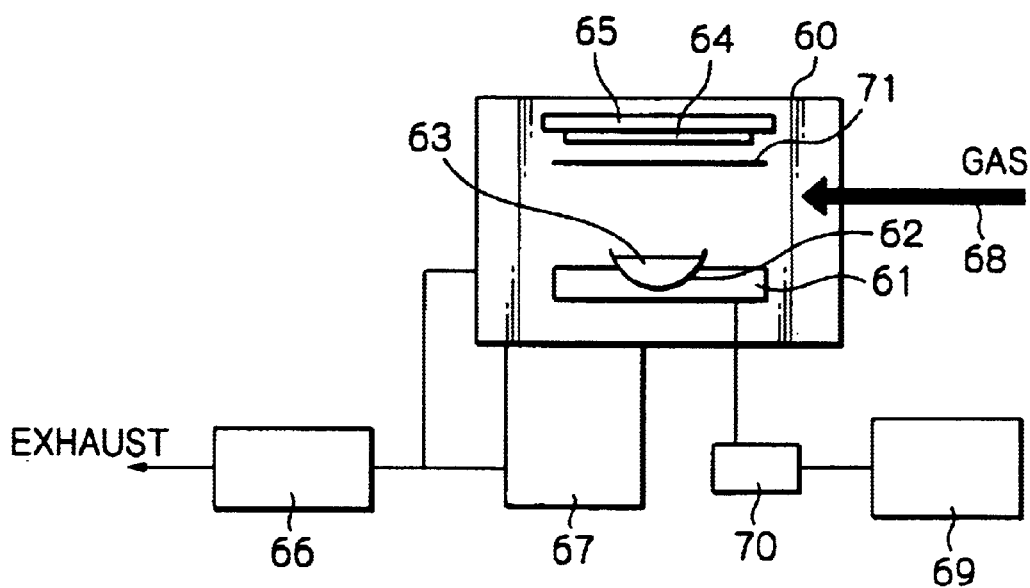
FIG. 6 schematically illustrates a configuration of a sputtering device used for depositing a layer of a first example.

FIG. 6 schematically illustrates a configuration of a sputtering device used for depositing the layer in this first example. This sputtering device is a general parallel plate sputtering device.

As shown in the figure, in a chamber 60, a high purity liquid of gallium 63 is held in a crucible 62 mounted on a lower electrode plate 61. A substrate to be sputtered 64 is held by an upper electrode plate 65. After arranging the substrate 64 and the high purity gallium liquid 63 at the predetermined positions, air is exhausted from the chamber 60 by a rotary pump 66 and an oil-diffusion pump 67. $N_2$ (nitrogen) gas 68 is introduced after checking that it has been exhausted to the predetermined degree of vacuum. At this time, mixed gas of Ar (argon) and $N_2$ gas may be used in stead of $N_2$ gas as the process gas.

After introducing the nitrogen gas 68 to a predetermined pressure, an electromagnetic wave of 13.56 MHz which is the industrial frequency is applied. This electromagnetic wave is supplied to the lower electrode plate 61 through a matching circuit 70 from a high frequency power supply 69.

Electric discharge arises between the upper electrode 65 and the lower electrode 61 by the nitrogen gas 68 and the electromagnetic wave introduced into the chamber 60. A shutter 71 is opened, after checking the stability of the electric discharge by viewing the discharge and by monitoring the state of the high frequency power supply 69. When a predetermined time period for deposition has elapsed, the shutter 71 is closed and the deposition process is completed. Thereafter, the chamber 60 is exhausted to the predetermined degree of initial vacuum and then opened to the air to extract the substrate 64 from the chamber.

As for the substrate 64, a three inches Si (100) substrate on which a NiFe film of 50 nm thickness had been deposited was used. This NiFe film functions as a lower electrode when its insulation property is evaluated. On the NiFe film, a GaN thin-film with a thickness of 20 nm was deposited by the aforementioned sputtering device and the process.

Crystallinity and insulation property of thus obtained sample were evaluated. The insulation property was evaluated according to the following steps:

(1) Leakage current with respect to DC current was measured using an aluminum electrode formed by utilizing a metal mask on the GaN film surface as a cathode electrode and the NiFe film formed on the substrate as an anode electrode; and (2) The measured characteristics was converted into characteristics of relative resistance change with respect to the electric field based in accordance with the electrode area and the thickness of the film.

Figure 7:
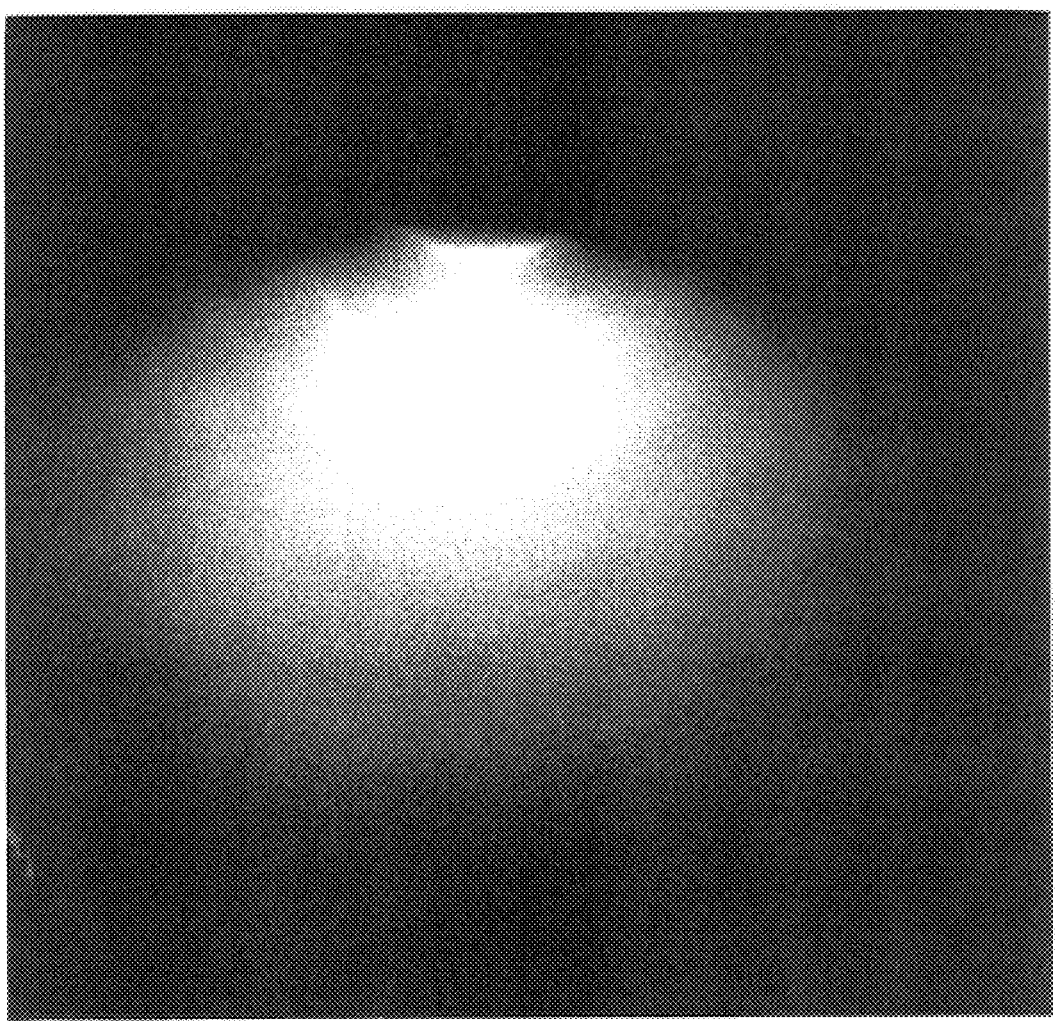
FIG. 7 shows a reflection high energy electron diffraction (RHEED) photograph of a sample of the first example.

FIG. 7 shows a reflection high energy electron diffraction (RHEED) photograph of this sample of the first example.

From the RHEED photograph in general, rings or spots resulting from crystallinity can be observed. With the photograph shown in FIG. 7, although it seems broad, rings which indicate crystallinity are fully observable. This result represents that the film of this first example is a GaN film having crystallinity.

Figure 8:
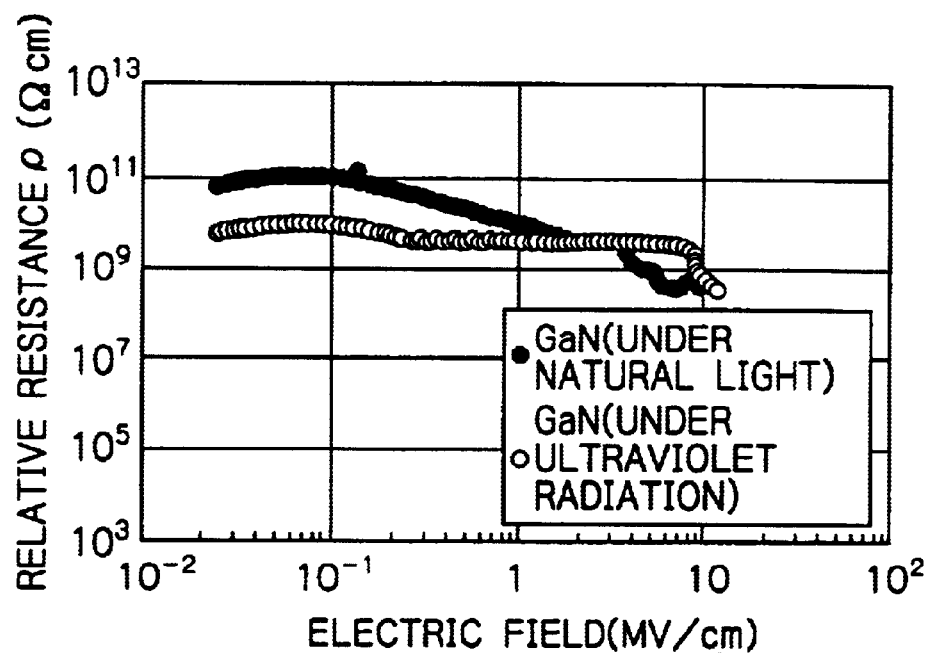
FIG. 8 shows a graph illustrating a measurement result of a relative resistance of the sample of the first example with respect to electric field.

FIG. 8 illustrates a measurement result of a relative resistance ρ of the sample of the first example with respect to electric field.

In the figure, filled circles represent measured data of the sample under natural light. The intensity of electric field applied to the actual thin-film magnetic head is about 0.1–2 MV/cm. As shown in the figure, within this electric field range, the relative resistance ρ of the sample is $10^{10}$–$10^{11}$ Ωcm which indicates that this sample film can be used in practical as the insulation film. The breakdown strength of the insulation film is indicated by an electric field at which the relative resistance changes from the value of the insulation material to that of the semiconductor material. From the literature, this relative resistance value is $10^9$ Ωcm. The breakdown strength of the sample in the example was about 6 MV/cm.

In the figure also, open circles represent measured data of the same sample under irradiation of the ultraviolet radiation. Two radiation sources of 8 W for irradiating the ultraviolet radiation of 254 nm were used for the measurement. It is apparent from the figure that the relative-resistance is falling by about two orders of magnitude at the maximum on the whole, and that a breakdown occurs at an electric field of about 8 MV/cm. Therefore, it can be understood that the GaN film shows the photoconduction effect against the ultraviolet radiation even when its crystallinity is poor.

SECOND EXAMPLE

In this second example, a strongly oriented GaN layer film was formed on an under layer of AlN and the characteristics was evaluated.

In this example, the upper GaN film was deposited by using the same sputtering device as the first example and the under AlN film was deposited by an electron cyclotron resonance (ECR) sputtering device.

Figure 9:
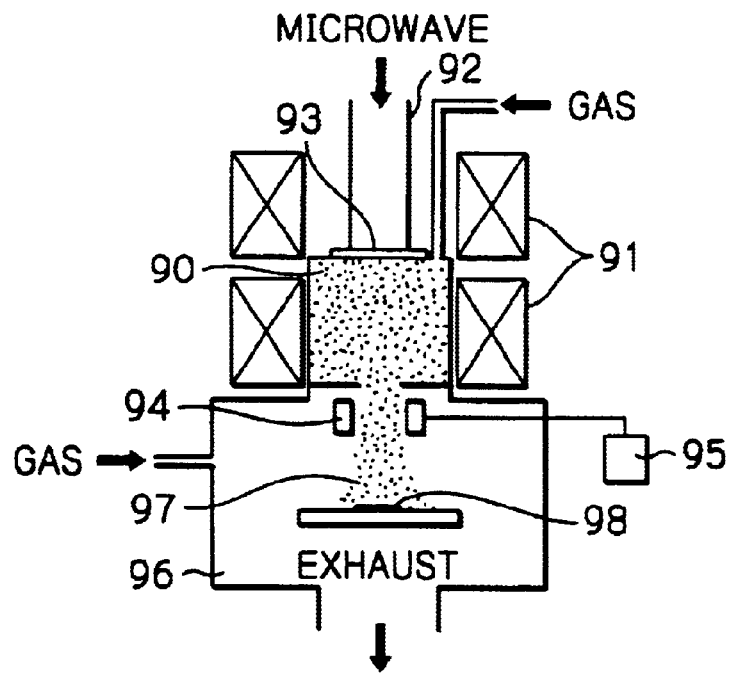
FIG. 9 schematically illustrates a configuration of an ECR sputtering device used for depositing a layer of a second example.

FIG. 9 schematically illustrates a configuration of the ECS sputtering device used for depositing the under layer in this second example. This sputtering device is a general ECR plasma sputtering device.

In the figure, reference numeral 90 denotes a plasma generation chamber, 91 coils for producing magnetic field, 92 a rectangular waveguide, 93 a quartz window, 94 a target, 95 a power source of the target 94, 96 a sample chamber, 97 a plasma flow, and 98 a substrate to be sputtered, respectively.

Applied to the plasma generation chamber 90 is the magnetic field of 875 G from the coils 91 in order to produce ECR conditions at 2.45 GHz. An opening is provided between the chambers 90 and 96. Around the opening, the target 94 is arranged to surround the plasma flow 97. In this example, aluminum (Al) of 5N is used as the target 94. To this target 94, a high frequency bias of 13.56 MHz is supplied from the power source 95. Ions in the plasma impact the target 94 to extract some target surface atoms. The neutral atoms are ionized in the plasma and accelerated with the plasma flow 97 to the substrate 98 to be deposited. In this example, performed is the reactive sputtering using mixed gas of Ar gas and $N_2$ gas.

Figure 10:
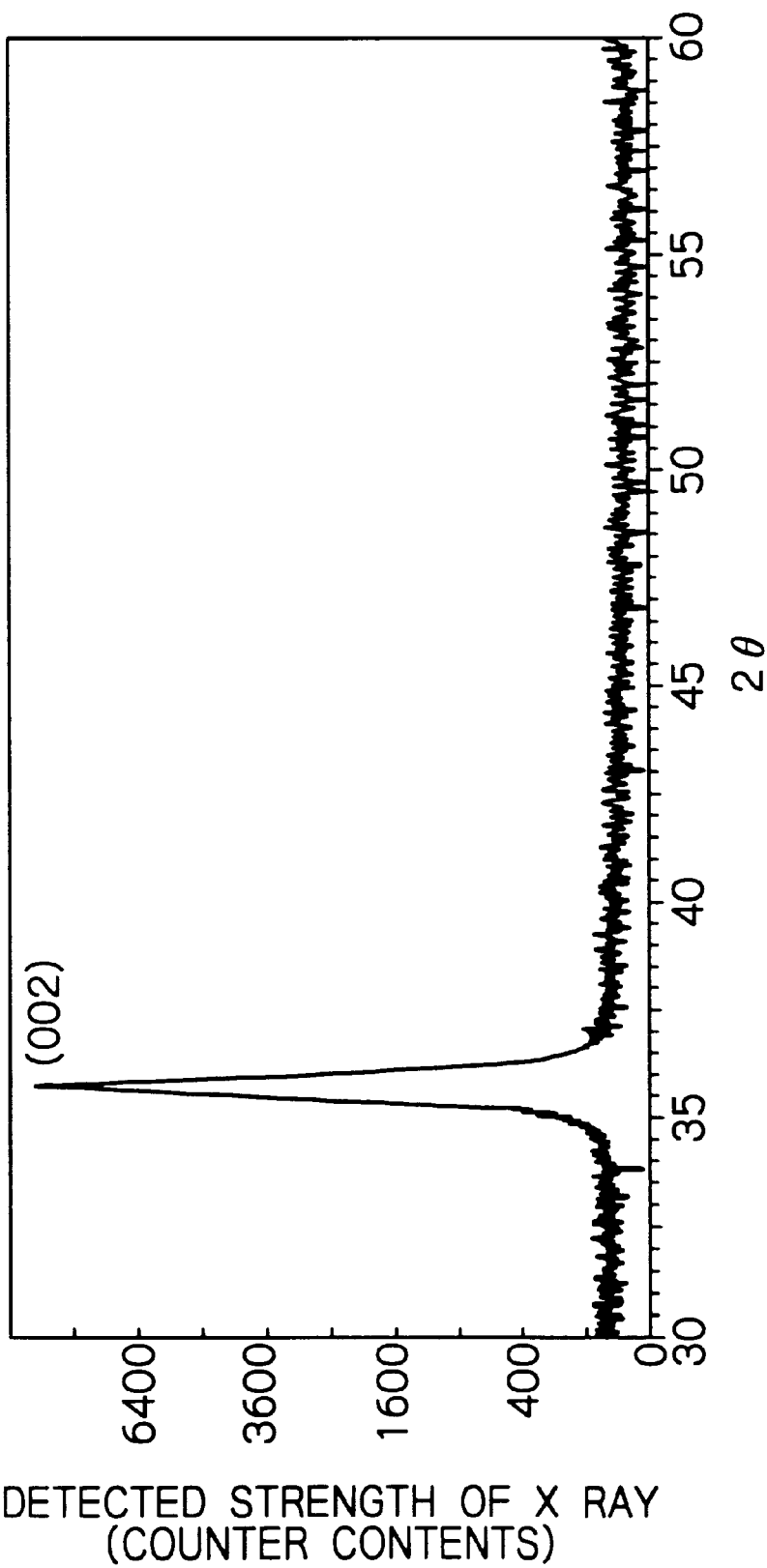
FIG. 10 shows a graph illustrating a measurement result of an X ray diffraction (XRD) of an AlN layer of a sample of the second example.

FIG. 10 illustrates a measurement result of an X ray diffraction (XRD) of the AlN layer with a thickness of 100 nm deposited by using this ECR sputtering device. In the figure, the horizontal axis indicates 2θ (an angle between incident X ray and reflected X ray against the sample), and the vertical axis indicates a detected intensity of the X ray (contents of the counter), respectively.

It is understood from this figure that the AlN film has the strong (002) orientation. In this example, the AlN film with a thickness of about 2 nm is formed as the under layer of the GaN film of 20 nm. Since there is the large difference in thickness between the AlN film and the GaN film, crystallinity of the AlN film cannot be directly proved from the measured characteristics shown in FIG. 10. However, if the conventional parallel plate sputtering device is used to obtain such strong (002) orientation, it will be necessary to deposit the AlN film to have several am thickness. Thus, FIG. 10 indicates that a strongly oriented AlN film can be deposited by the ECR sputtering.

Figure 11:
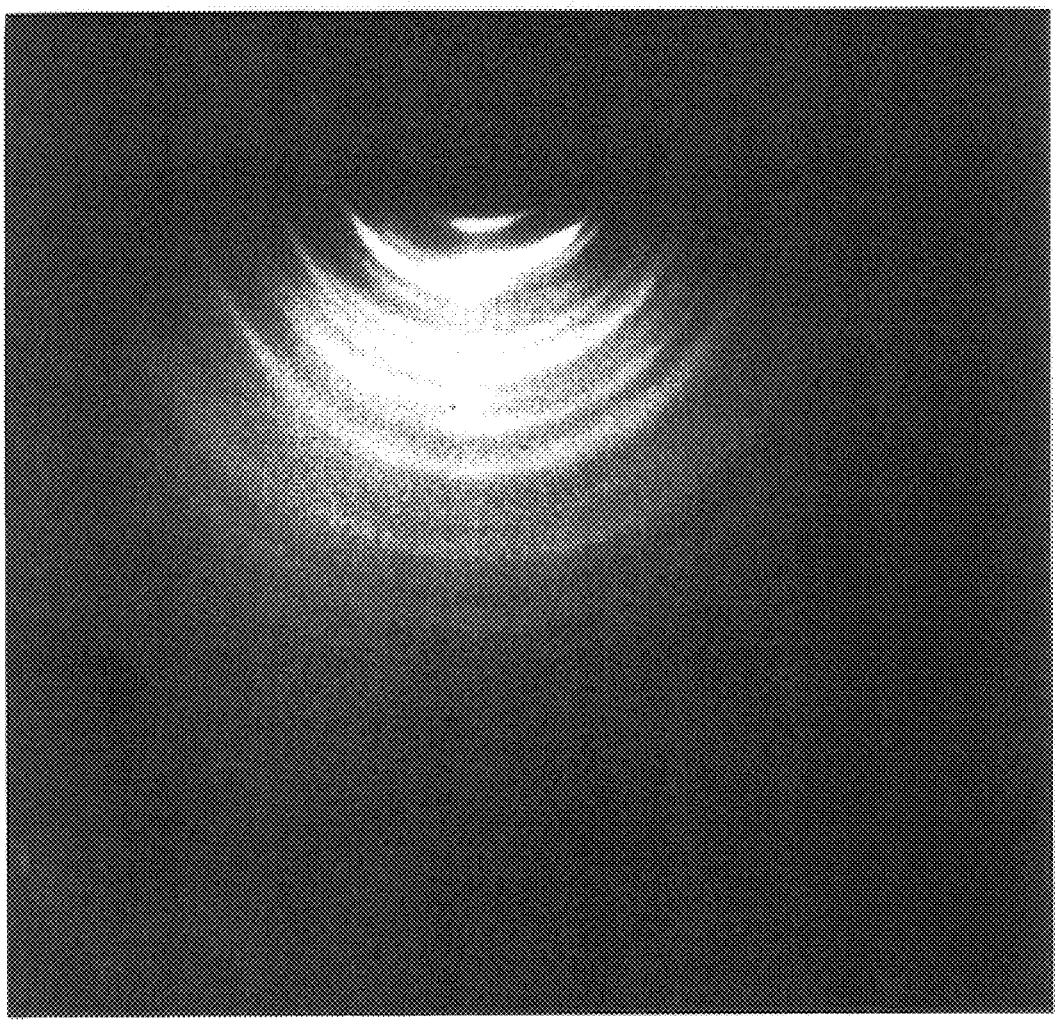
FIG. 11 shows a reflection high energy electron diffraction (RHEED) photograph of the sample of the second example.

FIG. 11 shows a reflection high energy electron diffraction (RHEED) photograph of the GaN film of about 20 nm deposited on the AlN under film of about 2 nm.

In comparison with the photograph shown in FIG. 7, rings which indicate crystallinity are more clearly observed. Thus, crystallinity of the GaN film is improved by using the under film of AlN. In other words, the AlN under film is effective to enhance the crystallinity of the GaN film.

Figure 12:
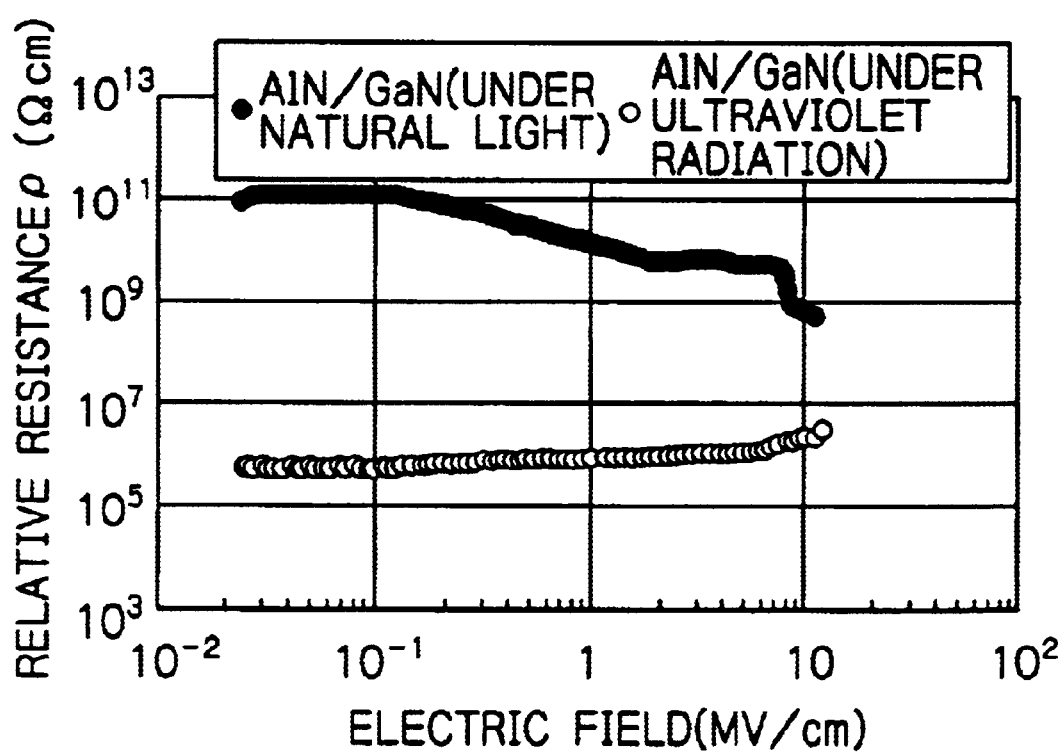
FIG. 12 shows a graph illustrating a measurement result of a relative resistance of the sample of the second example with respect to electric field.

FIG. 12 illustrates a measurement result of a relative resistance ρ of the sample of the second example with respect to electric field.

In the figure, filled circles represent measured data of the sample under natural light as well as these in the first example. The intensity of electric field applied to the actual thin-film magnetic head is about 0.1–2 MV/cm, and within this electric field range, the relative resistance ρ of the film is $10^{10}$–$10^{11}$ Ωcm which indicates that this sample film can be used in practical as the insulation film. The breakdown strength of this sample of the second example was about 8 MV/cm. It is supposed that this improvement of the breakdown strength in this example may be caused by various conduction mechanisms such as hopping produced at crystal boundaries which became clearer in accordance with the crystallinity improvement.

In the figure also, open circles represent measured data of the same sample under irradiation of the ultraviolet radiation. The radiation sources were the same as the first example. It is apparent from the figure that the electrical resistance of the sample is falling on the whole to $10^4$–$10^5$ $\Omega$cm, therefore this sample provides remarkable conductivity. It can be understood that due to the improvement of crystallinity the GaN film shows more remarkable photoconduction effect against the ultraviolet radiation.

Substantially the same data as that of the filled circles of FIG. 12 were obtained when the sample was measured again under natural light after irradiating the ultraviolet radiation. This indicates that the electrical characteristics of the AlN/GaN film is excellently reversible between the insulator and the conductor when it is disposed in the natural light environment and in the ultraviolet radiation irradiated environment, respectively.

THIRD EXAMPLE

In this third example, the AlN/GaN film of the second example was formed as lead insulation layers of a MR element of each thin-film magnetic head and the yield of the samples was evaluated. The lead insulation layers are lower and upper shield gap layers for electrically insulating a MR film, a GMR multi-layered film or a TMR multi-layered film and its lead conductors from lower and upper shield layers.

On the lower shield layer, an AlN film of 2 nm thickness for the under layer of the lower shield gap layer was deposited by the ECR sputtering. Then, on the AlN film, a GaN film of 20 nm thickness was deposited by the reactive sputtering using a high purity liquid state Ga as a target. After forming a GMR multi-layered film and its lead conductors on the lower shield gap layer, an AlN film of 2 nm thickness and a GaN film of 20 nm thickness were deposited as the upper shield gap layer. Thereafter, an upper shield layer is formed on the upper shield gap layer, and then an inductive write element is formed. Since the process of forming the upper shield layer and the processes performed after that are the same as the conventional processes, explanation of them is omitted in this specification.

The manufacturing processes of the thin-film magnetic head contain in general a wafer process (integration process) for fabricating many elements on a wafer using the integration technology, a machining process including a cutting process from the integrated wafer to bars, a machining and polishing process of the ABS and a separating process into individual head sliders, a HSA forming process for mounting the slider onto a suspension, and an assembling process of the HSA to a magnetic disk device. An ESD damage may be induced by handling at the processes after the wafer process, namely at the machining process, the HSA forming process and the assembling process.

In this example, the yield when each magnetic head piece separated from wafer samples and judged as good was mounted on the suspension was evaluated. Following four evaluation levels were made for comparison and 100 thin-film magnetic heads were prepared at each level.
(1) The lead insulation layers of each magnetic head were formed by $Al_2O_3$ films and mounting of the head to the suspension was performed under the natural light environment (wafer sample 1);
(2) The lead insulation layers of each magnetic head were formed by $Al_2O_3$ films and mounting of the head to the suspension was performed under the ultraviolet radiation environment (wafer sample 2);
(3) The lead insulation layers of each magnetic head were formed by AlN/GaN films and mounting of the head to the suspension was performed under the natural light environment (wafer sample 3); and
(4) The lead insulation layers of each magnetic head were formed by AlN/GaN films and mounting of the head to the suspension was performed under the ultraviolet radiation environment (wafer sample 4), where the natural light environment is an environment irradiated by general fluorescent lamps.

Table 1 shows the yield with respect to the wafer samples 1–4 when the magnetic heads separated from the respective wafer samples were mounted on the suspensions.

TABLE 1

| | Wafer Sample 1 | Wafer Sample 2 | Wafer Sample 3 | Wafer Sample 4 |
|---|---|---|---|---|
| Yield | 78% | 82% | 79% | 94% |

There is no significant difference in the yield between the conventional $Al_2O_3$ films, namely the wafer sample 1 shows 78% and the wafer sample 2 shows 82%. Also, the wafer sample 3 using the AlN/GaN films for the insulation films shows 79% which is substantially the same as that of the $Al_2O_3$ films. Whereas in case of the wafer sample 4 using the AlN/GaN films for the insulation films and the mounting of each magnetic head separated from this wafer sample to the suspension was performed under the ultraviolet radiation environment, the yield is improved up to 94%.

In general, the lead insulation layers are not directly exposed to the ABS but a DLC (diamond like carbon) film is formed on the ABS as a protection layer. It is known that the DLC film is opaque to the ultraviolet radiation. However, in this example, since the thickness of the DLC film is 10 nm or less, it is supposed that its shielding effect of the ultraviolet radiation was remarkably low.

FOURTH EXAMPLE

In this fourth example, the AlN/GaN film of the second example was formed as an overcoat layer of a MR element of a thin-film magnetic head and the yield as a product was evaluated.

The overcoat layer is a protection layer with a thickness of several tens $\mu$m, formed for the purpose of sealing the whole element after the end of all integration processes. This overcoat layer made of typically $Al_2O_3$ protects the element from electric or environmental influence from the exterior.

As will be noted from the result of the example 3, the ESD damage can be extremely reduced from occurring by using the AlN/GaN films instead of the $Al_2O_3$ films as the lead insulation layers in the magnetic head and by treating the head under the ultraviolet radiation irradiated environment. However, if the AlN/GaN film instead of the $Al_2O_3$ film is used as the overcoat layer, an area exposed to the exterior will become larger to increase the effect of the ultraviolet radiation irradiation. In addition, the thickness of several tens $\mu$m of the overcoat layer will greatly increase the sectional area of a short circuit induced by the photoconduction. Therefore, if the AlN/GaN film is used as the overcoat layer, further improvement of the resistance properties against ESD can be expected.

In this example, the yield of wafer samples with the overcoat layer using different materials was evaluated. The conventional $Al_2O_3$ films were used as the lead insulation layers.

The thickness of the overcoat layer is determined depending upon the size of the element. Typically, the deposition will be carried out to have 20–60 μm thickness. Since the overcoat layer just after the deposition has an unevenness surface reflecting the element shape, a flattening process such as a mechanical precise polishing will be performed in most cases. In this example, the surface planarization of the overcoat layer was performed by the polishing just after the deposition to obtain the overcoat layer with a height of several tens am from the substrate surface.

A wafer sample 5 was formed by depositing a conventional $Al_2O_3$ film with a thickness of about 50 μm on the wafer using a high frequency sputtering device with parallel plate electrodes, and then by polishing its surface for planarization to have an overcoat layer with a height of about 40 μm from the wafer surface.

A wafer sample 6 was formed by depositing an AlN film with a thickness of about 10 nm on the wafer as an under layer using the ECR sputtering similar to the examples 2 and 3. Then, on the AlN film, a GaN film of about 50 μm thickness was deposited by the reactive sputtering using a high purity liquid state Ga as a target. Thereafter, by polishing its surface for planarization as well as the wafer sample 5, an overcoat layer with a height of about 40 μm from the wafer surface was formed. The thickness of the overcoat layer is represented by the total thickness of the AlN film and the GaN film. However, the thickness of the AlN film may be negligible.

A wafer sample 7 was formed by decreasing the thickness of the AlN/GaN film than that of the wafer example 6 in order to evaluate the sectional area of the short circuit due to the photoconduction. When forming the wafer sample 7, the same deposition process as the wafer sample 6 was performed but the time period for polishing the deposited film surface for planarization was extended. Thus, an overcoat layer with a height of about 20 μm from the wafer surface was formed.

For each of the wafer samples 5–7, 200 thin-film magnetic heads were prepared. Mounting of the 100 heads of them to the suspensions were performed under the natural light environment, and mounting of the remaining 100 heads to the suspensions were performed under the ultraviolet radiation environment. The conditions of the light sources were the same as that in the examples 1–3.

Table 2 shows the yield with respect to the wafer samples 5–7 when the magnetic heads separated from the respective wafer samples were mounted on the suspensions.

TABLE 2

|  | Wafer Sample 5 | Wafer Sample 5 | Wafer Sample 7 |
|---|---|---|---|
| Under Natural Light | 78% | 79% | 80% |
| Under Ultraviolet Radiation | 81% | 98% | 96% |

The yield with respect to the wafer sample 5 in which the overcoat layer was formed by the conventional $Al_2O_3$ film is about 80% regardless of whether the ultraviolet radiation is irradiated or not. Contrary to this, although the yield with respect to the wafer samples 6 and 7 in which the overcoat layer was formed by the AlN/GaN film was about 80% as well as the wafer sample 5 when the mountings of the heads were performed under the natural light irradiated environment, the yield could be increased to 98% for the wafer sample 6 and 96% for the wafer sample 7 when the mountings of the heads were performed under the ultraviolet radiation irradiated environment.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head comprising insulation layers, at least a part of said insulation layers being made of an insulation material which increases electric conductivity thereof when an ultraviolet radiation is irradiated, wherein said thin-film magnetic head includes a magnetoresistive effect element having shield gap layers, a magnetoresistive effect film sandwiched by said shield gap layers and lead conductors connected to said magnetoresistive effect film and sandwiched by said shield gap layers, and wherein said at least a part of said insulation layers includes said shield gap layers.

2. The thin-film magnetic head as claimed inc claim 1, wherein said thin-film magnetic head includes an element formed surface on which at least one head element is formed, and wherein said at least a part of said insulation layers includes an overcoat layer for covering said element formed surface.

3. The thin-film magnetic head as claimed in claim 1, wherein said magnetoresistive effect element is a giant magnetoresistive effect element.

4. The thin-film magnetic head as claimed inc claim 1, wherein said magnetoresistive effect element is a tunnel magnetoresistive effect element.

5. The thin-film magnetic head as claimed in claim 1, wherein said at least a part of said insulation layers includes a GaN film.

6. The thin-film magnetic head as claimed in claim 1, wherein said at least a part of said insulation layers includes an under layer of an AlN film, and a GaN film deposited on said AlN film.

7. A head suspension assembly comprising said thin-film magnetic head claimed in claim 1.

8. A magnetic disk drive comprising at least one head suspension assembly claimed in claim 7.

* * * * *